June 4, 1957 P. H. WELLS ET AL 2,794,853

SUBMARINE CABLE AMPLIFIER AND WAVE SHAPER

Filed May 31, 1951 3 Sheets-Sheet 1

INVENTORS
P. H. WELLS
C. H. CRAMER

BY

M. F. Reynolds
ATTORNEY

SUBMARINE CABLE AMPLIFIER AND WAVE SHAPER

Filed May 31, 1951 3 Sheets-Sheet 2

*INVENTORS*
P. H. WELLS
C. H. CRAMER

*BY*

M. J. Reynolds
ATTORNEY

INVENTORS
P. H. WELLS
C. H. CRAMER
BY
ATTORNEY 2,794,853

SUBMARINE CABLE AMPLIFIER AND WAVE SHAPER

Philip H. Wells, Chatham, N. J., and Clifford H. Cramer, Great Neck, N. Y., assignors to The Western Union Telegraph Company, New York, N. Y., a corporation of New York Application May 31, 1951, Serial No. 229,193

4 Claims. (Cl. 178—63)

The present invention relates to submarine cables and more particularly to submarine cables having submerged repeaters incorporated therein.

As indicated in the copending patent application of H. F. Wilder, Serial No. 229,146, filed concurrently herewith, now Patent No. 2,637,784, addition of a repeating amplifier in a submerged portion of a submarine cable circuit provides a number of advantages, such as a large increase in the permissible speed of telegraphic communication over the cable.

The amplifier circuit used in such a submerged repeater must be capable of providing a relatively large degree of amplification without introducing appreciable distortion and with as small an operating power requirement as possible.

Use of a submerged repeater in a submarine cable also permits an improvement in the wave shaping achieved at the receiving station because preliminary wave shaping may be accomplished at the repeater.

Accordingly, it is an object of the invention to provide a new and improved amplifier circuit for a submerged submarine cable repeater.

More particularly, it is an object of the invention to provide a relatively high gain low distortion amplifier having low power requirements.

Another object of the invention is to provide a wave shaping system for telegraph signals received over a submarine cable and in which the wave shaping operation is divided between a submerged repeater and the shore receiving station.

Still another object of the invention is to provide a wave shaping network for a submarine cable receiving station suitable for use with a submarine cable having a submerged repeater incorporated therein.

Further objects of the invention will appear from the following description.

In accordance with the invention, these objects are achieved by providing a multi-stage cascade amplifier having an impedance element common to the output circuits of the first and last stages thereof and applying the voltage produced thereacross to the input circuit of the first stage in degenerative relationship at the signal frequencies and by providing cooperating wave shaping networks at the input of the repeating amplifier and at the input of the receiving station amplifier.

The invention will now be described in greater detail with reference to the appended drawing in which.

Figure 1:
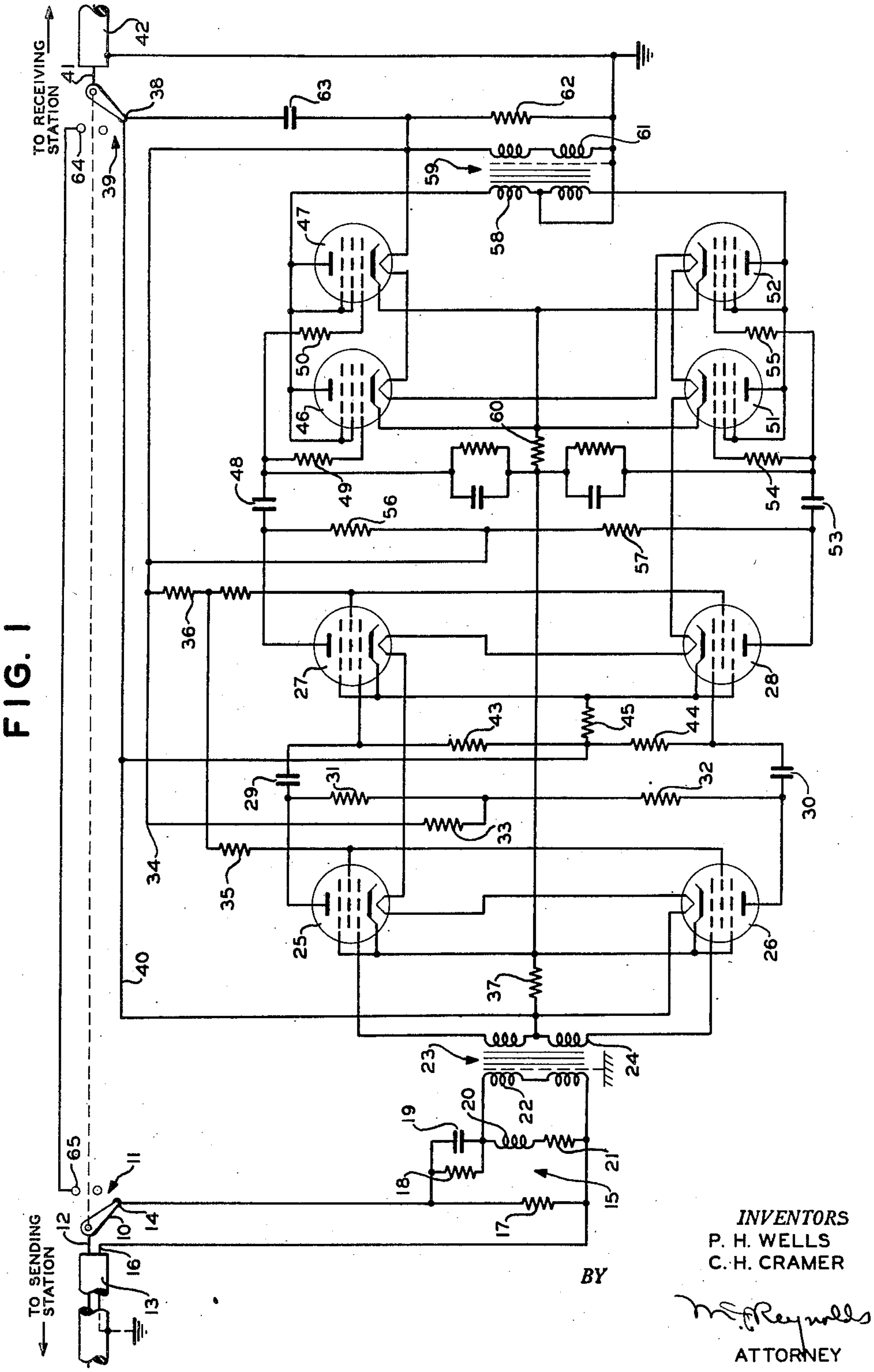
Fig. 1 illustrates a repeating amplifier and wave shaping circuit in accordance with the invention.

Referring now to the drawing and more particularly to Fig. 1, telegraph signals from a sending station are applied to a tongue 10 of a switch 11 from a conductor 12 of a submarine cable 13. Contact 14 of switch 11 is connected to a wave shaping network 15 and to a cable ground conductor 16 through a resistor 17. The input ground is carried back toward the sending station on a cable conductor 16, which may be realized as a second conductor of a section of bi-core cable, for a considerable distance, such as one-quarter mile, and is then earthed on the cable armor wires. This effectively separates the repeating amplifier input and output grounds, thereby suppressing undesired feedback effects.

Wave shaping network 15 includes a series section comprising the parallel combination of a resistor 18 and a capacitor 19 and a shunt section comprising the series connection of an inductor 20 and a resistor 21. The output terminals of network 15 are connected to a primary winding 22 of an input transformer 23. The ends of secondary winding 24 of transformer 23 are coupled in push-pull relationship to the control grids of push-pull amplifier tubes 25 and 26.

The anodes of tubes 25 and 26 are coupled, respectively, to the control grids of push-pull amplifier tubes 27 and 28 through coupling capacitors 29 and 30, respectively. The anodes of tubes 25 and 26 are coupled to ground potential through resistors 31 and 32, respectively, and through a resistor 33 and a conductor 34. The screen grids of tubes 25 and 26 are connected together and to conductor 34 through series connected resistors 35 and 36. The cathode and suppressor grids of tubes 25 and 26 are connected together and are connected to the center tap of secondary winding 24 through a resistor 37. The center tap of secondary winding 24 is connected to a contact 38 of a switch 39 through a conductor 40. Negative operating potentials are supplied to contact 38 over conductor 41 of cable 42 from the receiving station.

The control grids of tubes 27 and 28 are coupled to conductor 40 through resistors 43 and 44, respectively, the junction of these resistors being coupled to the cathodes and suppressor grids of tubes 27 and 28 through a resistor 45. The anode of tube 27 is coupled to the control grids of parallel connected tubes 46 and 47 through a coupling capacitor 48 and through resistors 49 and 50, respectively. The anode of tube 28 is coupled to the control grids of parallel connected tubes 51 and 52 through a coupling capacitor 53 and through resistors 54 and 55, respectively. The anodes of tubes 27 and 28 are also coupled to conductor 34 through resistors 56 and 57, respectively.

Tubes 46, 47, 51 and 52 are each triode connected and tubes 46 and 47 are coupled in push-pull relationship with respect to tubes 51 and 52. The anodes of tubes 46 and 47 are connected to one end of a primary winding 58 of an output transformer 59. The anodes of tubes 51 and 52 are connected to the other end of primary winding 58. The center tap of winding 58 is connected to ground. The cathodes of tubes 46, 47, 51 and 52 are interconnected and coupled to the junction of the cathodes of tubes 25 and 26 with resistor 37 through a resistor 60. Cable conductor 41 is supplied with a negative operating potential in order to minimize electrolytic effects at the submerged repeater.

It is evident that the return path for anode current of tubes 46, 47, 51 and 52 includes resistor 37 in the cathode circuits of tubes 25 and 26. A portion of the amplifier output signal voltage will therefore be developed across resistor 37 and will be applied in phase coincidence to the control grids of tubes 25 and 26, thereby producing degeneration at the signal frequencies. The voltage developed across resistor 37 will tend to reduce signal distortion and to compensate for unbalance between the respective tubes of the push-pull stages.

Secondary winding 61 of output transformer 59 is connected between ground and conductor 34 and is shunted by a resistor 62. The end of winding 61 remote from ground is also connected to contact 38 through a coupling capacitor 63.

The heaters of all the amplifier tubes are connected in series between conductors 40 and 34, so that the negative voltage from cable conductor 41 is applied thereto.

A contact 64 of switch 39 is connected directly to contact 65 of switch 11 so that the cable circuit may be completed without the amplifier. Switches 39 and 11 are preferably ganged. They may also be provided with additional switching positions for providing testing conditions in the cable circuit. If spare amplifiers or tubes are to be included in the repeater, they may be controlled by additional contact positions. A suitable switching arrangement including testing positions, spare amplifier positions and switch operating apparatus is disclosed in the copending patent application of F. B. Bramhall et al., Serial No. 229,191, filed concurrently herewith.

Wave shaping network 15 performs two functions. In conjunction with wave shaping apparatus at the receiving station, to be described in detail hereinafter, it serves to correct the wave shape of received signal pulses. It also serves as an impedance matching device to match the impedance of cable 13 to the input impedance of transformer 23 so that there will be an over-all impedance match between the cable and the amplifier input signal grids. Capacitor 19, which is in series with the cable circuit, and inductor 20, which is shunted across the cable circuit, are preferably tuned to series resonance at 1.5 times the dot frequency in order to peak the received signal at this frequency.

Figure 2:
Figs. 2 and 3 illustrate transient wave shapes for explaining the operation of the circuit of Fig. 1.
Figure 3:

Fig. 2 shows an idealized received transient signal. The wave shape of Fig. 2 can never be achieved in practice because of the non-linear amplitude-frequency and phase-frequency characteristics of the cable circuit. An actual received transient signal may have the shape illustrated in curve *a* of Fig. 3. The leading edge of this wave is not sufficiently steep for proper operation of receiving apparatus. Furthermore, the maximum amplitude thereof is too great and will produce too great a swing in grid voltage for the input amplifier stage. By shifting the phase of the high frequency components with respect to the low frequency components, a wave having the shape of curve *b* of Fig. 3 may be secured. It will be noted that the leading edge of curve *b* is relatively steep, its maximum amplitude relatively small and its duration relatively short. The short duration will prevent mixing of impulses when telegraph signals are transmitted.

The parallel combination of capacitor 19 and resistor 18 in series with the cable circuit presents a lower reactance to high frequency components than to low frequency components. The series combination of inductor 20 and resistor 21 shunted across the cable circuit provides a higher reactance for high frequency components than for low frequency components. Both combinations tend to emphasize and shift the phase of the higher frequency components with respect to the lower frequency components and to attenuate very low frequency components, thereby converting a wave shape of the type shown in Fig. 3*a* to the type shown in Fig. 3*b*. Capacitor 19 and inductor 20 may be tuned to 1.5 times the dot frequency to emphasize signal components in the neighborhood of 1.5 times the dot frequency.

It is not necessary that the wave shaping provided at the repeater be as complete as that normally provided at the receiving station. The equipment required for complete wave shaping would be too bulky for incorporation in a submerged repeater of practical size and adjustment thereof in service would be impracticable. Furthermore, the wave shape tends to deteriorate in the cable section between the repeater and the receiving station. It has been found that, at higher signalling frequencies, partial wave shaping at the repeater coupled with wave shaping at the receiving station will produce a much more desirable signal at the output of the receiving amplifier than is normally achieved with shaping at the receiving station only. At low signalling frequencies, wave shaping at the repeater does not yield a significant improvement. At higher signalling frequencies, however, the improvement is quite marked. The higher signal frequencies are those at which a given cable without a repeater could not be operated because of interference levels. The improvement in wave shape is particularly noticeable if the repeater is located as taught in the copending application of H. F. Wilder, referred to hereinbefore, because the effect of electrical disturbances in shallow coastal water on the signal wave shape will be materially reduced. Also, signal distortion may be compensated more effectively at the receiving station without an undue increase in the susceptibility of the receiving amplifier to interference.

Figure 4:
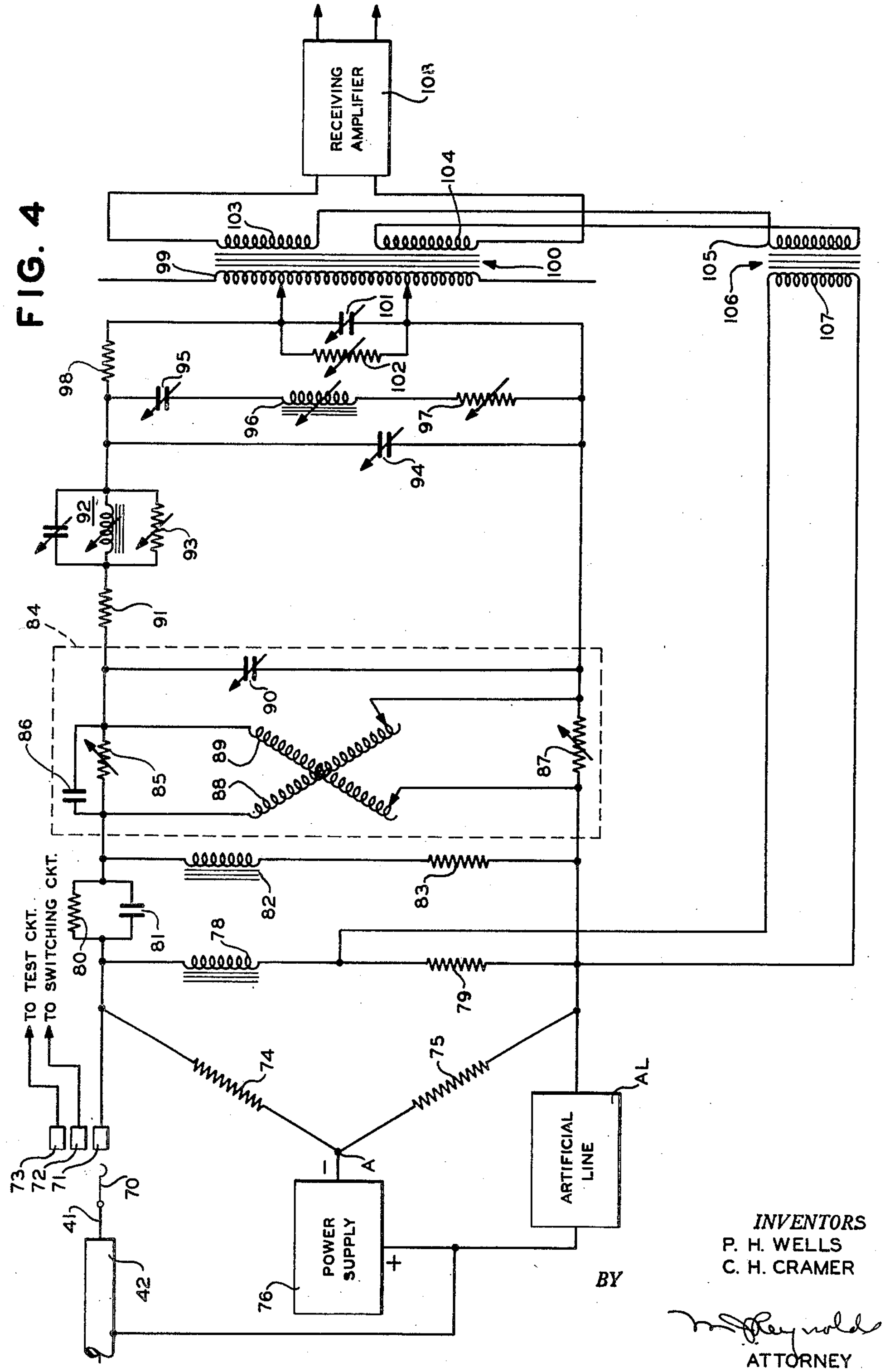
Fig. 4 illustrates a receiving station wave shaping circuit in accordance with the invention.

Amplified telegraph signals are transmitted over cable 42 from the repeater to the shore receiving station, a portion of which is illustrated in Fig. 4. Cable conductor 41 may be connected through a plug 70 to a signal receiving contact 71 or to contacts 72 or 73 for switching or testing purposes.

Contact 71 is connected to resistor 74 which, together with resistor 75, constitute two arms of a cable bridge circuit. The other two arms of the receiving bridge circuit are constituted by the input impedance of the cable circuit and the impedance of an artificial line AL. The apex A of the cable bridge is connected to the negative terminal of a direct voltage power supply 76 which provides operating potentials for the amplifier circuit of Fig. 1. The positive terminal of supply 76 is connected to the cable ground and to the ground terminal of artificial line AL, the constants of which approximate those of the cable circuit. The other terminal of artificial line AL is connected to the free end of resistor 75.

Shunted across resistors 74 and 75 is a series circuit comprising an inductor 78 and a resistor 79. The inductance value of inductor 78 is made relatively large to prevent the passage therethrough of all but very low frequency components of the signal pulses. These low frequency components develop a voltage across resistor 79 for a purpose to be described hereinafter.

The parallel combination of a resistor 80 and a capacitor 81 is connected in series with the upper branch of the signal circuit between inductor 78 and the series combination of an inductor 82 and a resistor 83 shunted across the signal circuit at the input of a phase shifting network 84. Resistor 80 serves to by-pass some low frequency signal components around capacitor 81 and also to isolate the two series shunting circuits. Capacitor 81 and inductor 82 are series tuned to 1.5 times the dot frequency to peak this frequency component of the signals at the input of phase shifter 84.

Phase shifter 84 comprises a parallel combination of variable resistor 85 and capacitor 86 in the upper signal branch and a variable resistor 87 in the lower signal branch. Two windings 88 and 89 intercouple, respectively, the ends of resistor 85 to the opposite ends of resistor 87. Windings 88 and 89, which are magnetically coupled in quadrature relationship, are provided with adjustable tapping for connection to resistor 87. A variable capacitor 90 is shunted across the output of phase shifter 84 to tune phase shifter 84 to parallel resonance at a frequency equal to 1.5 times the dot frequency.

Figure 5:
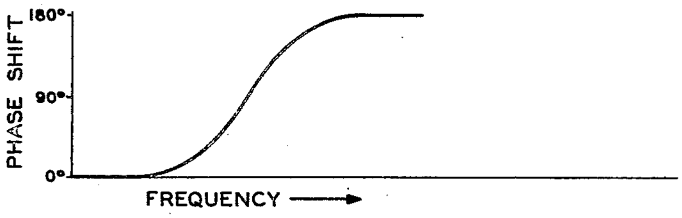
Fig. 5 is a phase shift diagram for explaining the operation of the circuit of Fig. 4.

Phase shifter 84 provides a phase shift of approximately 180° for the high frequency components with respect to the low frequency components, and lesser amounts of phase shift for intermediate frequency components. The phase shifting characteristics of phase shifter 84 are illustrated in Fig. 5 which is a plot of phase versus frequency.

An isolating resistor 91 in the upper signal branch intercouples the output of phase shifter 84 and a parallel resonant circuit 92. Circuit 92 is tuned to any frequency which it is desired to suppress or selectively attenuate in operation and will, in general, be an undesired frequency peaked by the cable circuit. A resistor 93 in circuit 92 serves to adjust the damping thereof and hence the sharpness of tuning. Circuit 92 is given an inductive reactance at 1.5 times the dot frequency so that it can be series resonated at 1.5 times the dot frequency with a capacitor 94 shunted across the signal circuit.

Also shunted across the signal circuit at this point is a series resonant circuit comprising a variable capacitor 95, a variable inductor 96 and a variable resistor 97. This series resonant circuit is tuned to any frequency which it is desired to suppress or selectively attenuate.

The upper signal branch contains an isolating resistor 98 for coupling to an output circuit comprising primary winding 99 of transformer 100, variable capacitor 101 and variable damping resistor 102. Winding 99 and capacitor 101 are parallel tuned to 1.5 times the dot frequency.

The secondary of transformer 100 is divided into two windings 103 and 104 which are connected in series through secondary winding 105 of a transformer 106. Primary winding 107 of transformer 106 is connected across resistor 79 so that low frequency components developed thereacross as hereinbefore described will be added to the output voltage. The output of the secondary winding of transformer 100 is supplied to the receiving amplifier 108.

Figure 6:
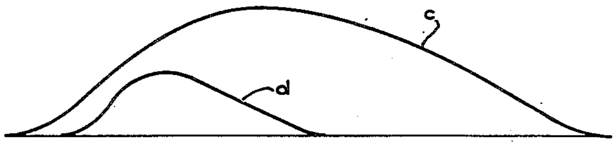
Figs. 6, 7, 8 and 9 show transient wave shapes for explaining the operation of the circuit of Fig. 4.

Curve *c* of Fig. 6 illustrates a typical transient wave shape at the output of cable 42 in the absence of a repeater in the cable circuit. Curve *d* illustrates a received wave shape with a repeater in the circuit. It will be noted that curve *d* has a steeper leading edge than curve *c*. The smaller maximum amplitude of curve *d* is of no importance because only the beginning of the wave is used in operating receiving equipment.

Figure 7:
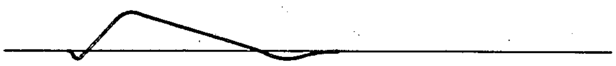
Figure 8:
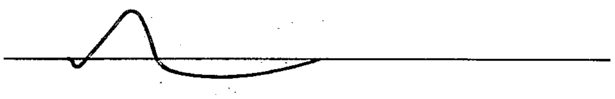
Figure 9:

Fig. 7 shows the wave shape of the transient signal of Fig. 6*d* at the input of the receiving amplifier. It should be noted that without the low frequency emphasis circuit including transformer 106, the wave shape at the receiving amplifier input would exhibit a relatively large negative excursion as shown in Fig. 8. The low frequency emphasis circuit provides a correcting wave as shown in Fig. 9 which, when combined with the wave of Fig. 8 in transformer 100, yields the wave of Fig. 7. It will be noted that the wave of Fig. 7 has a steeper leading edge than wave *d* of Fig. 6. This is produced by proper adjustment of phase shifting circuit 84 together with the various peaking and attenuating circuits described hereinbefore.

While the invention has been described in a specific embodiment thereof and in a specific use, it is not desired that it be limited thereto, for obvious modifications thereof will occur to those skilled in the art without departing from the spirit and scope of the invention as set forth in the appended claims.

What is claimed is:

1. In a submersible repeater for incorporation in a submarine cable circuit, a repeating amplifier for amplifying telegraph signal voltages in said cable circuit comprising a first amplifying stage having an input circuit and an output circuit, said input circuit of said first amplifying stage including an impedance element, means to couple the input circuit of said first amplifying stage to said cable circuit, said means comprising a wave shaping network comprising a parallel combination of resistor means and capacitor means in series with the cable circuit and a series combination of resistor means and inductor means shunted across said cable circuit to shift the phase of high frequency components of said telegraph signals with respect to the phase of low frequency components thereof and to limit the maximum amplitude of said telegraph signals to a predetermined value, an additional amplifying stage having an input circuit coupled to the output circuit of said first amplifying stage and having an output circuit, the output circuit of said additional amplifying stage including said impedance element whereby a portion of the amplified signal voltage developed across the output circuit of said additional amplifying stage is applied to the input circuit of said first amplifying stage in degenerative relationship at the frequencies of said signal voltages, and means to couple the output circuit of said additional amplifying stage to said cable circuit.

2. In a submersible repeater for incorporation in a submarine cable circuit, a repeating amplifier for amplifying telegraph signal voltages in said cable circuit comprising a plurality of cascade connected amplifying stages each having an input circuit and an output circuit, the input circuit of the first of said amplifying stages including a resistance element, means to couple the input circuit of said first amplifying stage to said cable circuit, said means comprising a wave shaping network comprising a parallel combination of resistor means and capacitor means in series with the cable circuit and a series combination of resistor means and inductor means shunted across said cable circuit to shift the phase of high frequency components of said telegraph signals with respect to the phase of low frequency components thereof and to limit the maximum amplitude of said telegraph signals to a predetermined value, the output circuit of the last of said amplifying stages including said resistance element whereby a portion of the amplified signal voltages developed across the output circuit of said last amplifying stage is applied to the input circuit of said first amplifying stage in degenerative relationship at the frequencies of said signal voltages, and means to couple the output circuit of said last amplifying stage to said cable circuit.

3. In a submarine cable circuit for communication by telegraph signals, a submarine cable, sending apparatus coupled to one end thereof, receiving apparatus coupled to the other end thereof, a submerged repeater interposed in a submerged portion of said submarine cable comprising a repeating amplifier for amplifying telegraph signal voltages in said cable circuit, said repeating amplifier including a first amplifying stage having an input circuit and an output circuit, said input circuit of said first amplifying stage including an impedance element, means to couple the input circuit of said first amplifying stage to said cable circuit comprising a first wave shaping network comprising a parallel combination of resistor means and capacitor means in series with the cable circuit and a series combination of resistor means and inductor means shunted across said cable circuit to shift the phase of high frequency components of said telegraph signals with respect to the phase of low frequency components thereof and to limit the maximum amplitude of said telegraph signals to a predetermined value, an additional amplifying stage having an input circuit coupled to the output circuit of said first amplifying stage and having an output circuit, the output circuit of said additional amplifying stage including said impedance element whereby a portion of the amplified signal voltages developed across the output circuit of said additional amplifying stage is applied to the input circuit of said first amplifying stage in degenerative relationship at the frequencies of said signal voltages, means to couple the output circuit of said additional amplifier stage to said cable circuit, said signal receiving apparatus comprising a receiving amplifier and a second wave shaping network intercoupling said cable and said receiving amplifier.

4. In a submarine cable circuit for communication by telegraph signals, a submarine cable, sending apparatus coupled to one end thereof, receiving apparatus coupled to the other end thereof, a submerged repeater interposed in a submerged portion of said submarine cable comprising a repeating amplifier for amplifying telegraph signal voltages, said repeating amplifier including a plurality of cascade connected amplifying stages each having an input circuit and an output circuit, the input circuit of the first of said amplifying stages including a resistance element, means to couple the input circuit of said first amplifying stage to said cable circuit comprising a first wave shaping network, the output circuit of the last of said amplifying stages including said resistance element whereby a portion of the amplified signal voltages developed across the output circuit of said last amplifying stage is applied to the input circuit of said first amplifying stage in degenerative relationship at the frequencies of said signal voltages, means to couple the output circuit of said last amplifying stage to said cable circuit, said signal receiving apparatus comprising a receiving amplifier and a second wave shaping network interconnecting said cable and said receiving apparatus.

References Cited in the file of this patent

UNITED STATES PATENTS

| | | |
|---|---|---|
| 1,921,022 | Burton | Aug. 8, 1933 |
| 1,961,334 | Burton | June 5, 1934 |
| 2,020,317 | Jacobs | Nov. 12, 1935 |
| 2,020,318 | Jacobs | Nov. 12, 1935 |
| 2,070,071 | Strohmeyer | Feb. 9, 1937 |
| 2,288,487 | Rosen | June 30, 1942 |
| 2,542,160 | Stoner et al. | Feb. 20, 1951 |
| 2,556,218 | Roche et al. | June 12, 1951 |
| 2,570,294 | Van Mierlo | Oct. 9, 1951 |
| 2,605,333 | Job | July 29, 1952 |

FOREIGN PATENTS

| | | |
|---|---|---|
| 919,538 | France | May 11, 1947 |

OTHER REFERENCES

Radio Engineers Handbook, Terman, 1st ed., pg. 376, pub. 1943 by McGraw Hill Book Co., N. Y.